United States Patent [19]

Kennedy

[11] 4,431,290

[45] Feb. 14, 1984

[54] PORTABLE PHOTOGRAMMETRY SYSTEM

[75] Inventor: John H. Kennedy, Frederick, Md.

[73] Assignee: Bechtel Power Corporation, San Francisco, Calif.

[21] Appl. No.: 367,508

[22] Filed: Apr. 12, 1982

[51] Int. Cl.³ .................... G03B 35/08; G03B 15/03
[52] U.S. Cl. .................................. 354/113; 354/132; 354/219; 354/294
[58] Field of Search ............... 354/112, 113, 114, 115, 354/116, 117, 132, 133, 140, 147, 165, 219, 221, 222, 294

[56] References Cited

U.S. PATENT DOCUMENTS

| | | | |
|---|---|---|---|
| 2,851,936 | 9/1958 | Seiden | 354/132 |
| 2,891,458 | 6/1959 | Grimal | 354/294 |
| 3,622,242 | 11/1971 | Land et al. | 354/165 |
| 4,183,647 | 1/1980 | Kuraishi | 354/132 |

Primary Examiner—A. A. Mathews
Attorney, Agent, or Firm—Townsend and Townsend

[57] ABSTRACT

A short-range hand-held photogrammetry system consists of two cameras placed in rigidly fixed photographic positions at the remote ends of a hollow bar. The hollow bar mounting the cameras encloses a wiring harness between the cameras, has attached conventional solenoid actuated shutter closing devices and mounts two downwardly protruding handles for hand holding of the bar and attached cameras. At least one flash unit is wired in series serially through each shutter mechanism of each camera. Both shutters are normally closed and opened for each exposure. These shutters when opened for exposure each close a normally open flash circuit switch. The series connection of the flash actuator requires that both shutters must be opened at the same time for the flash to fire, thus freezing in the same instant of time the pair of stereo photographs, one photograph by each camera. Under each lens of each camera is placed a beam projector that is activated by a pushbutton switch on the back of the bar. Light beams projected by the beam projector are positioned to locate side terminators of the areas of overlap between the two cameras. Photographer reference to the point of beam impact enables a photogrammetric survey to be rapidly taken.

10 Claims, 5 Drawing Figures

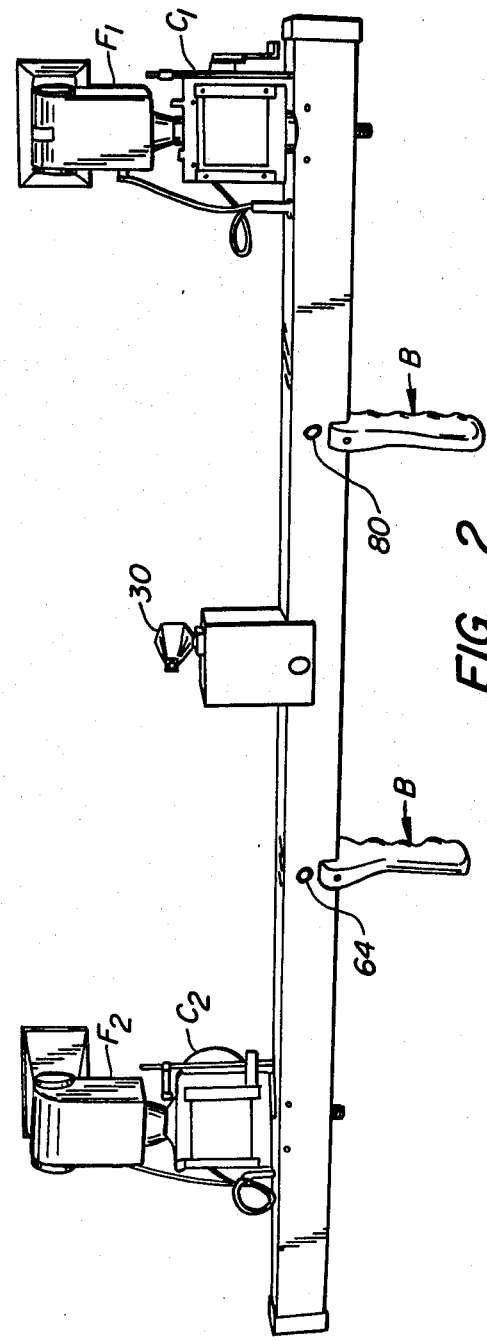
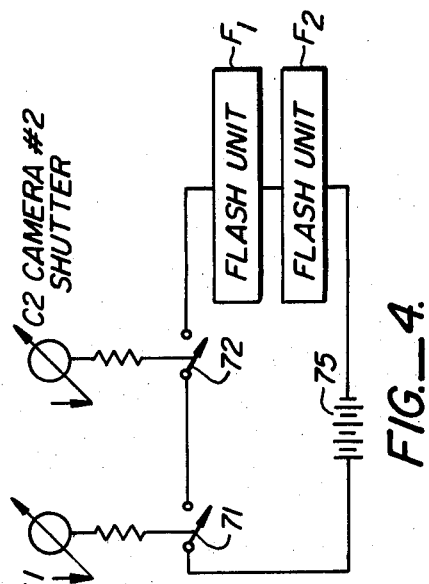
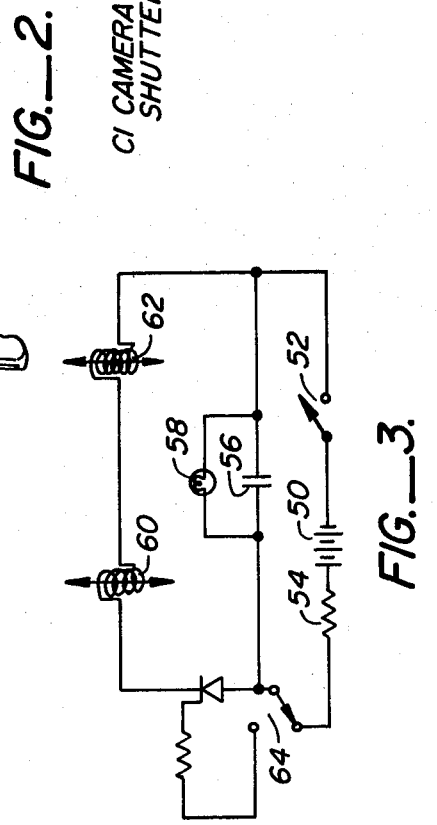

PORTABLE PHOTOGRAMMETRY SYSTEM

This invention relates to photogrammetry and specifically to a portable photogrammetric system.

SUMMARY OF THE PRIOR ART

Photogrammetry is known. Typically, spaced apart and tripod mounted cameras are used. These cameras take paired stereo pictures of the same scene; using both pictures, an object appears in three dimensions. Later, the spatial information can be used for dimensional analyses of a scene. Some type of "ground control" is used, meaning that there is some known dimensional information of points in the picture area to generate actual dimensions from the photographs.

Photographs from close range photogrammetry are usually read in an analytical plotter. Typically, the plotter, with certain interior camera data, uses data from this ground control to analyze the photographs for dimensions. Thereafter, the plotter assigns points in a spatial coordinate system to all objects within the field. Presuming that the photographs are originally taken with precise parallatic displacement relative to one another, the analytical plotter and accompanying computer hardware can provide dimensional information using the recorded and different parallatic displacement on each of the pictures. Thus, dimensional information from the photographs covers spatially located points throughout the photographically recorded field.

It is required that the photos of each camera be taken of the same scene. If both cameras are not in exact parallel lines at the moment of exposure, erroneous information will be generated.

Heretofore, short range photogrammetry has not been conveniently adapted to a rapid photo survey. Plants containing elaborate piping and equipment matrixes, especially atomic power plants, have posed an especially difficult problem. This is because the internal crowding of such structures results in matrixes of pipes, pumps and other equipment. This crowding does not readily permit the use of tedious tripoding and still photographic techniques required by prior art photogrammetric devices as set forth above.

The present invention has the advantage of using conventional off-shelf prior art devices for taking the pictures. For example in the disclosure immediately following, a Hasselbald SWC camera with a 38 MM wide angle lens is utilized for the recordation of each photograph. This camera has a pupil mounted shutter adjacent the lens. Like virtually all modern cameras, the shutter is open to expose film, a normally open shutter-actuated flash switch closes to complete a flash actuation circuit.

SUMMARY OF THE INVENTION

A short range hand held photogrammetry system consists of two cameras placed in rigidly fixed photographic positions at the remote ends of a hollow bar. The hollow bar mounting the cameras encloses a wiring harness between the cameras, has attached conventional solenoid-actuated shutter closing devices and mounts two downwardly protruding handles for hand holding of the bar and attached cameras. At least one flash unit is wired in series serially through each shutter mechanism of each camera. Both shutters are normally closed and opened for each exposure. These shutters when open for exposure each close a normally open flash circuit switch. The series connection of the flash actuator requires that both shutters must be opened at the same time for the flash to fire, thus freezing in the same instant of time the pair of stereo photographs, one photograph by each camera. Under each lens of each camera is placed a beam projector that is activated by a pushbutton switch on the back of the bar. Light beams projected by the beam projector are positioned to locate the side terminators of areas of overlap between the two cameras. Photographer reference to the point of beam impact enables a photogrammetric survey to be rapidly taken.

OTHER OBJECTS AND ADVANTAGES

An advantage of this hand-held photogrammetric system is that the flash is serendipitously used. The flash shows that both pictures are taken at the same instant of time. Suprisingly, the flash also shows that both pictures were taken simultaneously. Therefore, the spatial separation and angular orientation of both pictures is that provided by the bar at the instant of the flash, even though the bar is hand held.

A further advantage of this invention is that more than one strobe unit can be used. In a preferred embodiment of this invention, each camera is provided with its own strobe unit. By having a strobe unit from each camera's own perspective, exact, precise and full illumination sufficient to enable accurate stereopsis is obtained.

A further advantage of this invention is to utilize an electronic freeze of a strobed electronic flash to do away with the necessity for tripoding. Pictures taken are given a simultaneous reference equivalent to that of tripod mounted prior art cameras. Consequently, time and alignment procedures required with analytical plotters are reduced.

A further advantage of this disclosed system is the vastly improved portability of the resultant photogrammetric system. Pictures can be taken from virtually anywhere in the interior of a plant containing a piping, pump, and equipment matrix. Tripod support and rigid camera bracing are no longer needed; the disclosed camera system is hand held.

Yet a further advantage of the disclosed system is that it is readily adaptable to the wide angle, high depth of field optics on the cameras. For instance on a $2\frac{1}{4}'' \times 2\frac{1}{4}''$ camera, wide angle lenses of 38 millimeters may be utilized. Thus the disclosed system may be used immediate to and a short distance from the area to be surveyed.

A further object of this invention is to provide a light beam projection system which in conjunction with the view finder enables photogrammetric survey. According to this aspect of the invention, each of the paired cameras has the edge of image termination nearest the adjacent camera marked by a beam projector. These beam projectors delineate between them, the overlap of the two photographic fields being recorded and hence the effective side terminators of the stereoscopic information. A gross central sight determines the upper and lower boundaries of the fields being recorded. In use, an operator actuates through a normally open switch the beam projectors to grossly delimit the recorded volume of the photogrammetric survey. An advantage of this aspect of the invention is that a photographer assigned to a photogrammetric survey is given rough physical delineation of the stereopsis recorded on each pair of photographs. With this delineation, rapid survey is possible. Consequently, the disclosed system is capable of use in a short time to rapidly photograph on an *as built* format a complex plant, such as an atomic power plant containing a matrixes of pipes, pumps, and other equipment.

Other objects, features, and advantages will become more apparent after referring to the following specifications and attached drawings describing the invention:

FIG. 2 is a photogrammetric camera rig similar to the rig of FIG. 1, here illustrating cameras spaced on 3-foot centers with a rear perspective view of the cameras being illustrated;

FIG. 3 is an electrical schematic illustrating the principles of a tank circuit used to simultaneously fire the shutter mechanisms of both cameras;

FIG. 4 is a wiring schematic of the flash unit firing circuit; and

Figure 1:
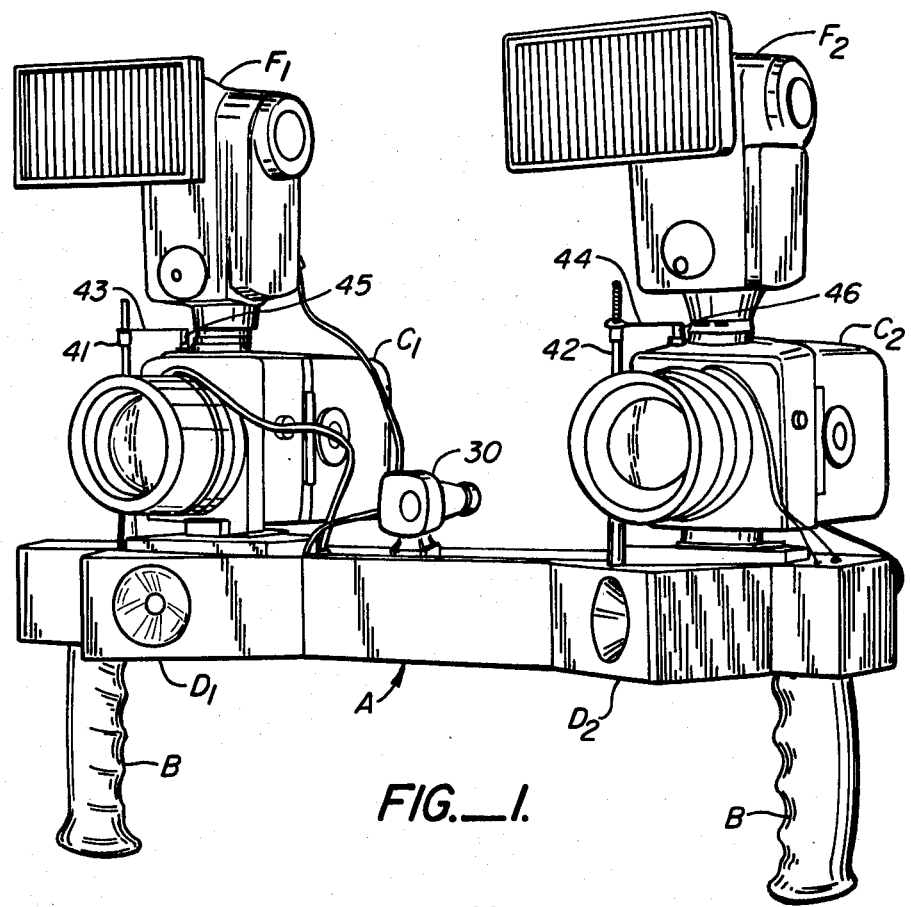
FIG. 1 is a front perspective view of a photogrammetric camera rig according to this invention wherein cameras are spaced on 12-inch centers.

Referring to FIG. 1, a rigid hollow aluminum bar A has paired grips B extending downwardly therefrom. Grips B enable a cameraman to grasp the unit with both hands to rigidly brace and hold the unit. It will be realized that this bracing is merely for purposes of grossly recording the field; the simultaneous flash of the strobe units is utilized for instantaneous "freezing" of the units one with respect to the other.

Figure 5:
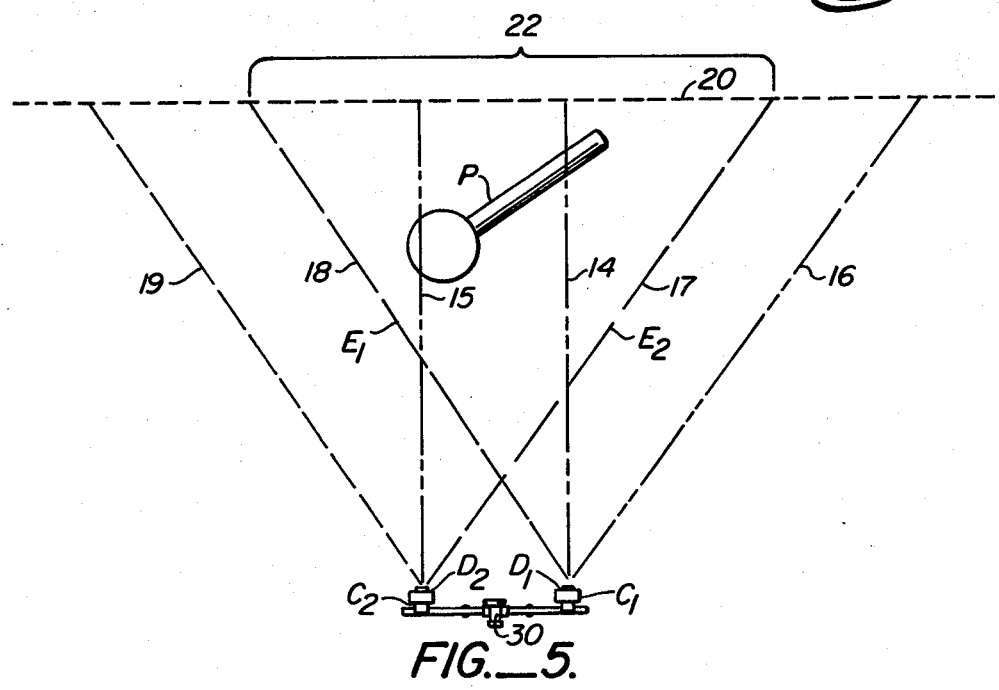
FIG. 5 is a diagram of the beam projectors for roughly delimiting the stereoscopic information surveyed.

Paired cameras C1 and C2 are utilized. These respective cameras are aligned as illustrated in FIG. 5. Specifically, the cameras are aligned with their respective axes 14, 15 straight ahead.

Relatively wide angle lenses having large depths of field are preferred. The image terminators of the respective cameras can be easily understood. Specifically, the image of camera C1 terminates along side image terminators 16, 18. The image of camera C2 terminates along side image terminators 17, 19.

Assuming that the respective camera units take a photograph of a wall 20 shown by the broken line, it can be seen that the stereoscopic information will comprise the photographic overlap of both cameras. Therefore, the stereoscopic information will lie in the area enclosed by the brackets 22 on wall 20 and within image terminator 17 from camera C2 and image terminator 18 from camera C1.

Each of the camera units is equipped with a gross central sight 30 (see FIGS. 1 and 2). This gross central sight 30 permits the photographer to obtain in a conventional manner the vertical terminators of the photographic information.

Mechanically, the cameras are rigidly mounted to bar A. Such mounting occurs so that the cameras are faced as illustrated in FIG. 1. Solenoid actuated shaft 41 extends from bar A upwardly to and towards the upper portion of camera C1. A leaf spring 43 connects the end of shaft 41 with the shutter mechanism 45 on camera C1. From second solenoid, shaft 42, a leaf spring 44 connects to the shutter mechanism 46. With simultaneous actuation of both mechanisms, the leaf spring softens the simultaneous actuation of the shutter much in the manner that the human finger when depressing the respective shutter mechanisms 45, 46 acts upon the shutter. The solenoids are schematically shown in FIG. 3.

The electro-mechanical circuit utilized for actuation of the shutter is simply described. Referring to FIG. 3, a 240-volt battery 50 is connected across and actuates a tank circuit through closure of a main switch 52. Upon closure of the main switch 52, trickle (low current) charging through a resistor 54 to the 500-microfarad 300-volt tank capacitor 56 occurs. A conventional ready light 58 reads the 240-volt differential when it is across tank circuit capacitor 56 and illuminates when the camera circuits are ready to simultaneously fire.

Firing of the solenoid 60 for camera C1 and solenoid 62 for camera C2 occurs through a silicon controlled rectifier at normally open pushbutton switch 64. When electrical contact is made, the silicon controlled rectifier opens and the energy of the tank circuit capacitor 56 is released causing current flow in both solenoids 71, 72 to simultaneously depress both camera shutters 45, 46 through the respective bars and leaf springs.

It has been found that there are any number of happenstances in the operation of two cameras which can cause the shutter mechanisms to not open simultaneously. One of the most common of these happenstances is where one camera has had the film advanced and other camera has not had the film advanced. Alternately, varying mechanical responses may be present at the shutter mechanisms. These responses may be sufficient to permit opening of the shutters to be simultaneously most of the time but not all of the time. Clearly the failure to have both cameras record images simultaneously in a photogrammetric survey could lead to a missing pair of photographs in an otherwise complete survey. The lack of 3-dimensional information on an asbuilt basis could be fatal to a survey.

It is in this environment that the mechanism of FIG. 4 is utilized.

Each of the cameras is equipped with a respective flash unit F1, F2. These camera units are wired and actuated in series as illustrated in the schematic of FIG. 4. Specifically, the shutter mechanism of camera C1 is schematically illustrated by a circle with an arrow through the middle. This shutter mechanism is normally closed and when it is actuated opens the shutter. Opening of the shutter closes normally open switches 71 in the case of camera C1 and 72 in the case of camera C2. This equipment is obtained when one purchases the cameras.

Referring to FIG. 4, it can be seen that flash circuit power source 75 is series connected through switches 71, 72 to the respective flash units F1 and F2. This is part of the novel departure from the prior art. Only one such flash unit need be used. However, in the preferred embodiment here and to assure that accurate stereopsis results, each camera is given its own flash unit from its own photographic perspective. This enables a complete photographic recording to be made.

The reader will readily understand that actuation of the flash units will not occur if both normally opened switches 71, 72 are not simultaneously closed. Further, it is the nature of strobe flashes that they in effect "freeze" the subject matter as of the instant of the flash. Thus the particular orientation to which the respective camera units are turned at the instant of flash will determine the information recorded.

Note that the flash has a serendipitous effect. Not only does it freeze in the instant of time the photographic information, but it also shows that both shutter mechanisms on both cameras have fired and have fired simultaneously. If either shutter mechanism fails to operate, or both shutter mechanisms fail to operate simultaneously, no flash of the strobes will occur. This lack of flash will be a visual cue to the cameraman that stereoscopic information for that particular viewpoint was not recorded.

Referring again to FIG. 1, it will be noted that camera C1 has a beam projector D1 immediately below its lens. Similarly camera C2 has a beam projector D2 immediately below its lens. These respective beam projectors are used to visually mark the terminator of the stereoscopic area 22 seen in FIG. 5. They may be adjustable for camera lenses of varying angles.

Referring to FIG. 5, it will be seen that beam projector D1 has a beam E1 which is projected along the terminator 18 of the field of camera C1. Similarly, beam projector D2 has a beam E2 which is projected along the terminators 17. Where the camera is taking a 3-dimensional picture of pump and piping P, the respective beam projectors will hit and illuminate the rear wall 20. A cameraman sighting the unit will be informed by the point of incidence of the respective beams E1, E2 on the wall 20 where the terminators of stereoscopic information are. By simple triangulation from his vantage point, a photographer will know that stereoscopic information has been recorded in the triangular volume bounded by terminators 17, 18 and wall 20. By rotating the camera unit in a horizontal plane from a single advantage point he can systematically record in 3-dimensions the volume interior of a piping matrix.

The beam projectors are operated by a normally opened switch 80 (see FIG. 2) upon depression of the switch 80 immediately above one of the handles B. Light beams from conventional light bulbs and beam reflects are projected outwardly from the camera where they can impinge upon an object (such as wall 20) giving the desired visual cue.

The reader will appreciate that variation within the scope of the present invention can occur. Camera rigs with more than two cameras can be used. Different orientations can be used for the respective cameras as well as different lens combinations.

What is claimed:

1. A portable photogrammetric camera apparatus comprising in combination: a rigid bar; paired cameras with respective normally closed shutters, each said shutter having a flash circuit with a normally open electrical switch attached thereto, said switch operatively connected to said shutter to close upon opening of said shutters; means for simultaneously opening the shutters of both said cameras; at least one flash having an actuating circuit series connected successively through said normally opened switches attached to each of said shutters whereby said flash is actuated by said actuating circuit only when both said flash circuits are closed and therefore both said shutters are open to freeze with the light of said flash images on both said cameras.

2. The invention of claim 1 and including fastening said flash to said bar.

3. The invention of claim 1 and wherein said apparatus includes more than one flash.

4. The invention of claim 1 and including paired flashes with one each of said flashes attached to one of said cameras.

5. A photogrammetric camera in which at least two cameras photograph overlapping fields, each said camera being equipped with a normally closed shutter having a normally open electrical switch mechanically linked to said shutter, said electrical switch closing upon opening o said shutter; means for opening the shutter on each said camera simultaneously as affixed to a rigid bar and a flash circuit actuated by said cameras to supply illumination to said camera, the improvement to said flash cicuit comprising: a series circuit connecting serially the normally opened electrical switches on each said camera to said flash circuit, whereby said flash is actuated only when said cameras have their shutters simultaneously opened and the actuation of the said flash is a telltale of simultaneous exposure by said flash of the film in both cameras.

6. The invention of claim 5 and including more than one flash.

7. The invention of claim 5 and including more than one flash attached in said actuating circuit.

8. A photogrammetric camera comprising in combination: a rigid bar; first and second cameras fixed to said rigid bar each taking pictures of respective first and second fields, said cameras as fixed to said bars having said first and second fields overlap; the first camera having a side image terminator in the field of the second camera to define a first boundary of overlap and the second camera having a side image terminator in the field of the first camera to establish a second boundary of overlap; first and second beam projectors, one of said beam projectors being placed immediate to said first camera and pointed along said first boundary and the other of said beam projectors being placed immediate to said second camera and pointed along said second boundary.

9. The invention of claim 8 wherein said respective beam projectors are angularly adjustable to preselected postions in the respective fields of said camera.

10. The invention of claim 8 and wherein said bar includes a normally opened switch in a circuit actuating both said beam projectors, said switch being closed to delimit the area of overlap.

* * * * *